United States Patent
Fratti

(10) Patent No.: US 8,427,589 B2
(45) Date of Patent: Apr. 23, 2013

(54) AUDIBLE STATE INDICATION FOR A TELEVISION RECEIVER

(75) Inventor: Roger A. Fratti, Mohnton, PA (US)

(73) Assignee: Agere Systems LLC, Allentown, PA (US)

( * ) Notice: Subject to any disclaimer, the term of this patent is extended or adjusted under 35 U.S.C. 154(b) by 2430 days.

(21) Appl. No.: 11/103,815

(22) Filed: Apr. 12, 2005

(65) Prior Publication Data

US 2006/0227252 A1 Oct. 12, 2006

(51) Int. Cl.
*H04N 5/44* (2011.01)

(52) U.S. Cl.
USPC .................. 348/738; 348/730; 348/553

(58) Field of Classification Search ............ 348/730, 348/725, 734, 738, 460, 468, 465–466, 553, 348/484; 725/31, 34; 455/421; H04N 5/44, H04N 5/63, 5/60
See application file for complete search history.

(56) References Cited

U.S. PATENT DOCUMENTS

| 5,031,213 | A | * | 7/1991 | Kawasaki ................... 725/31 |
| 5,430,493 | A | | 7/1995 | Kim |
| 5,502,496 | A | * | 3/1996 | Hailey et al. ............... 348/462 |
| 5,528,316 | A | * | 6/1996 | Lee ............................. 348/725 |
| 5,631,698 | A | * | 5/1997 | Lee ............................. 348/178 |
| 5,659,366 | A | * | 8/1997 | Kerman ........................ 725/34 |
| 5,862,236 | A | * | 1/1999 | Haas et al. ................... 381/107 |
| 5,907,321 | A | | 5/1999 | Grossman et al. |
| 6,392,716 | B1 | * | 5/2002 | Nagata et al. ............... 348/731 |
| 6,704,061 | B2 | | 3/2004 | Mears et al. |
| 7,096,011 | B2 | * | 8/2006 | Kanazawa et al. .......... 455/421 |
| 2002/0133818 | A1 | | 9/2002 | Rottger |
| 2004/0131212 | A1 | | 7/2004 | Chang |

FOREIGN PATENT DOCUMENTS

| JP | 8098098 | 4/1996 |
| JP | 11352948 | 12/1999 |

* cited by examiner

*Primary Examiner* — Trang U Tran
(74) *Attorney, Agent, or Firm* — Ryan, Mason & Lewis, LLP

(57) ABSTRACT

A circuit for audibly indicating at least one state of a television receiver includes memory operative to store at least one audio file, and a controller. The controller is operative during a power-on interval of the television receiver to forward the at least one audio file to an audio indicating device associated with the television receiver for audibly indicating the at least one state of the television receiver.

21 Claims, 2 Drawing Sheets

US 8,427,589 B2

AUDIBLE STATE INDICATION FOR A TELEVISION RECEIVER

FIELD OF THE INVENTION

The present invention relates generally to television (TV) receivers, and more particularly relates to techniques for audibly indicating a state of a TV receiver during a power-on interval of the TV receiver.

BACKGROUND OF THE INVENTION

Modern flat-panel TV receivers, utilizing digital signals for visually displaying broadcast and/or video information, are becoming more prevalent. These flat-panel TV receivers, including liquid crystal display (LCD) TVs, plasma TVs, digital TVs (DTVs), etc., commonly exhibit an undesirable delayed response time when power is first applied. Specifically, when first turned on, the display screens of such flat-panel TV receivers may remain blanked (e.g., black) for several seconds after application of power, and the audio often remains muted during this period as well. The delay in presenting the audio and video signals is generally required in order for the TV receivers to perform certain initialization functions, such as, for example, loading video buffers in the TV receivers, video decoding, surge protection, etc. During this time period, there is often no, or an inadequate, indication to a viewer regarding the power-on state of the TV (e.g., whether the TV receiver is on or off). Consequently, an impatient viewer, questioning whether or not an "on" command initiated by the viewer (e.g., from a wireless remote control device) was successfully received by the TV, is likely to repeatedly press the "POWER" button (e.g., either on the TV itself or on the corresponding remote control device), thereby creating further uncertainty as to the state of the TV.

In an attempt to solve this problem, it is well known to utilize a visual indicator, such as, for example, a light emitting diode (LED), which is typically illuminated when the TV receiver is powered on, and is off otherwise, or vice versa. The LED may alternatively be one color (e.g., red) when the TV receiver is off, and another color (e.g., green) when the TV receiver is on. Visual indicators, however, are often difficult to see, particularly when there is a high level of ambient light present in a room, or when the viewer is seated at a distance from the TV receiver. Consequently, employing visual means for indicating the state of the TV receiver is not always sufficient. In some TVs, particularly older cathode ray tube (CRT) models, it is known to apply broadcast audio to a speaker of the TV receiver shortly after power-on. In a digital environment, however, portions of the audio signal often leak into the video signal (e.g., crosstalk), resulting in undesirable rolling artifacts in the video display while the TV is powering on.

Accordingly, there exists a need for improved techniques for indicating a power-on state of a TV receiver that does not suffer from one or more of the problems exhibited by conventional methodologies.

SUMMARY OF THE INVENTION

The present invention meets the above-noted need by providing, in an illustrative embodiment, a circuit for audibly indicating one or more states of a TV receiver during a power-on interval of the TV receiver. An audio indicator may be stored in memory included in the circuit, for example, as a digital audio file, and played on a speaker associated with the TV receiver. In this manner, the state of the TV receiver during the power-on interval is more clearly evident to a viewer, so as to substantially eliminate confusion.

In accordance with one aspect of the invention, a circuit for audibly indicating at least one state of a television receiver includes memory operative to store at least one audio file, and a controller. The controller is operative during a power-on interval of the television receiver to forward the at least one audio file to an audio indicating device associated with the television receiver for audibly indicating the at least one state of the television receiver.

In accordance with another aspect of the invention, a television receiver includes a circuit for audibly indicating at least one state of the television receiver. The circuit includes memory operative to store at least one audio file, and a controller. The controller is operative during a power-on interval of the television receiver to forward the at least one audio file to an audio indicating device associated with the television receiver for presenting the at least one audio file.

These and other features and advantages of the present invention will become apparent from the following detailed description of illustrative embodiments thereof, which is to be read in connection with the accompanying drawings.

DETAILED DESCRIPTION OF THE INVENTION

The present invention will be described herein in the context of an illustrative DTV receiver. It should be understood, however, that the present invention is not limited to this or any particular circuit arrangement, nor is the invention limited to a DTV receiver. Rather, the invention is more generally applicable to techniques for providing an audible indication as to a state (e.g., "on" or "off," diagnostic status, warranty status, etc.) of a TV receiver during a power-on interval of the TV receiver. The power-on interval can be defined herein as a period of time beginning just after application of power to the TV receiver (e.g., about 100 milliseconds (ms) after receiving a power-on command) and lasting for a certain duration (e.g., a few seconds). It is to be understood that the present invention is not limited to a particular start time of the power-on interval, nor is the power-on interval limited to any particular duration. In fact, the present invention contemplates that the power-on interval may be selectively controlled (e.g., start time and/or duration) as a function of certain characteristics of the TV receiver and/or certain viewer configurable attributes. In other embodiments of the invention, the viewer may disable the audible status indication, such as, for example, by setting an option in a viewer configuration menu, or alternative selection means, associated with the TV receiver.

Figure 1:
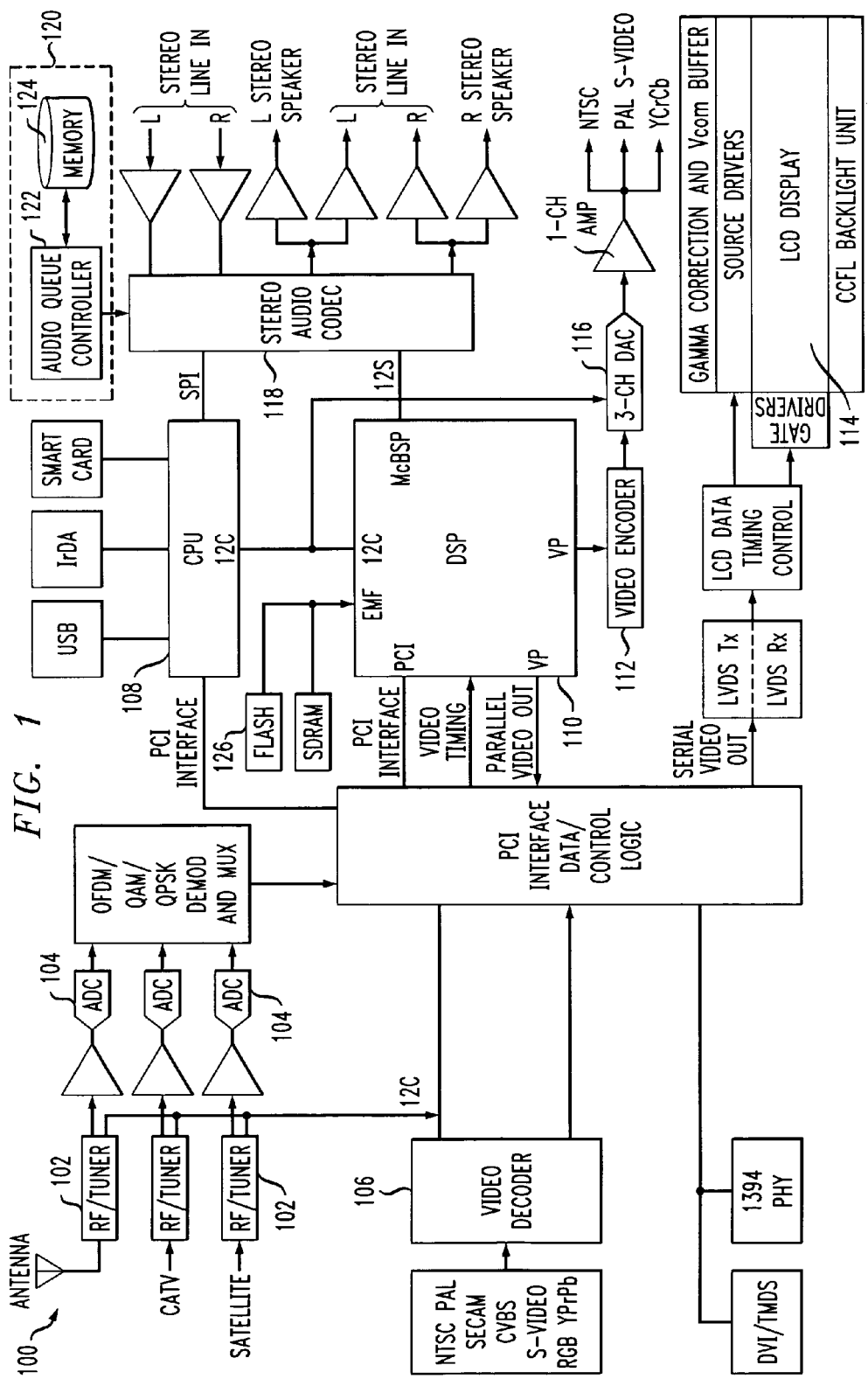
FIG. 1 is a block diagram depicting an illustrative DTV receiver in which the techniques of the present invention are implemented.

FIG. 1 is a block diagram depicting an illustrative DTV receiver 100 in which the techniques of the present invention are employed. The illustrative DTV receiver 100 is shown as comprising a plurality of functional blocks, including, for example, radio frequency (RF) tuners 102, analog-to-digital converters (ADC) 104, video decoder 106, central processing unit (CPU) 108, digital signal processor (DSP) 110, video encoder 112, liquid crystal display (LCD) 114, digital-to-analog converter (DAC) 116, a stereo audio coder-decoder (CODEC) 118, and various other functional blocks which may be necessary for implementing the DTV receiver, as will be known to those skilled in the art. The techniques of the present invention relate primarily to audio signal portions (e.g., CODEC 118) of the DTV receiver 100, and therefore many of the functional blocks shown in the figure (e.g., video decoder 106, video encoder 112, LCD 114, etc.) will not be described in detail herein. A more detailed discussion of DTV receivers in general may be found, for example, in the text by Jerry Whitaker, entitled "Television Receivers: Digital Video for DTV, Cable, and Satellite," McGraw-Hill, 2001, the disclosure of which is incorporated by reference herein.

In accordance with one aspect of the invention, the DTV receiver 100 includes an audible indication circuit 120 which is operative to provide an audible indication of a state of the DTV receiver during a power-on interval of the DTV receiver. Since the audible indication is presented during the power-on interval of the DTV receiver 100, the audible indication circuit 120 inherently provides an indication of a power-on state of the DTV receiver 100 (e.g., whether the DTV is on). The audible indication circuit 120 may additionally provide an audible indication of one or more other states of the DTV receiver 100, such as, but not limited to, system diagnostic status, warranty status (e.g., expired or in warranty), etc., during the power-on interval of the DTV receiver.

The audible indication circuit 120 preferably comprises a controller, such as, for example, audio queue controller 122, and memory 124 coupled to the controller. The audible indication to be presented by the audible indication circuit 120 is preferably stored in memory 124, such as, for example, as one or more digital audio files. The one or more digital audio files stored in memory 124 may be subsequently processed and played during the power-on interval of the DTV receiver. For example, the one or more audio files are preferably converted to an analog audio signal by the audio CODEC 118 in the DTV receiver 100, or by alternative digital-to-analog conversion circuitry (e.g., DAC), residing in the audible indication circuit 120, or external to the audible indication circuit.

It is to be appreciated that the term "controller" as used herein is intended to include any processing device, such as, for example, one that comprises a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include, for example, random access memory (RAM), read only memory (ROM), etc., as well as other computer-readable storage devices and/or media associated with a processor or CPU, such as, for example, a hard drive, flash memory, etc., as will be understood by those skilled in the art.

As previously stated, the power-on interval during which the audible indication is presented preferably begins just after application of power to the DTV receiver 100, such as, for example, about 50-100 ms after depressing a "POWER" button of the DTV receiver or corresponding remote control device, and lasts for a certain duration (e.g., a few seconds). Preferably, the start of the power-on interval is within a response time of a typical viewer, such as less than about 100 ms after depressing the "POWER" button on the DTV receiver or corresponding remote control device. The duration of the power-on interval may be substantially matched to a duration of, for example, a "warm-up" period of the LCD 114 in the DTV receiver 100, an initialization procedure performed by the DTV receiver, or some alternative reference timing of the DTV receiver, which may be specified, at least in part, by the viewer.

Figure 2:
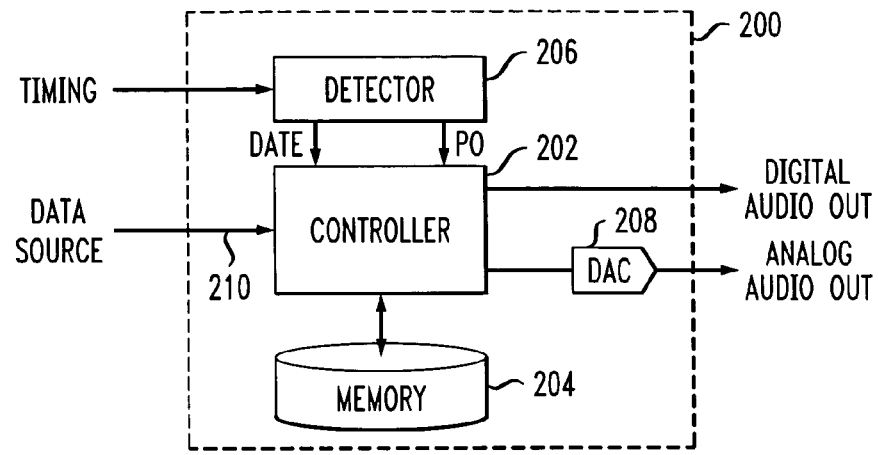
FIG. 2 is a block diagram depicting an exemplary audible indication circuit, formed in accordance with one embodiment of the invention.

FIG. 2 is a block diagram depicting an exemplary audible indication circuit 200 that may be employed in the illustrative DTV receiver 100 shown in FIG. 1. The exemplary audible indication circuit 200 includes a controller 202 and memory 204 coupled to the controller. The audible indication circuit 200 further includes a detector 206, or alternative detection circuitry. The detector 206 is preferably operative to generate at least a first control signal, such as a power-on signal (PO), the power-on signal indicating whether or not the DTV receiver 100 has successfully received a power-on command, such as, for example, by the viewer depressing a "POWER" button on the DTV receiver itself or on a corresponding remote control device, by a timer associated with the DTV receiver, etc. The power-on signal may be based, at least in part, on one or more timing signals (e.g., clock) received by the detector 206. The power-on signal being a first logic level, which may be a logic "1," may be indicative of a start of the power-on interval, while the power-on signal being a second logic level, which may be a logic "0," may be indicative of the DTV receiver being off. By way of example only, the detector 206 may periodically monitor (e.g., every few milliseconds) a system clock in the DTV receiver 100 (FIG. 1) as a means of indicating that a power-on command has been received by the DTV receiver.

In response to the power-on signal PO from the detector 206, the controller 202, in accordance with an illustrative embodiment of the invention, is preferably operative to retrieve at least one audio file, which may be stored in memory 204, and to forward the at least one audio file to an audio indicating device (e.g., a speaker) associated with the DTV receiver for audibly indicating the power-on state of the DTV receiver. In accordance with other embodiments of the invention, as will be described in further detail below, the detector 206 may be operative to generate additional control signals (e.g., DATE) for supplying further information to the controller 202 (e.g., current date/time). The additional information presented to the controller 202 can be used to provide an audible indication of one or more other states of the DTV receiver during the power-on interval, such as, but not limited to, warranty status.

For ease of explanation, the audible indication circuit 200 is depicted as a plurality of functional blocks, including controller 202, memory 204 and detector 206. The audible indication circuit 200, however, is not limited to the particular arrangement shown. Moreover, it is to be understood that at least a portion of one or more of the function blocks in the audible indication circuit 200 may reside externally to the audible indication circuit. For instance, one or more audio files used by the audible indication circuit 200 may be stored in memory (e.g., flash memory 126) included in the DTV receiver 100 shown in FIG. 1. Likewise, some (or all) of the functionality of controller 202 and/or detector 206 may be implemented by CPU 108 in the DTV receiver 100 (see FIG. 1), with the CPU configured, in accordance with the present invention, to run a program for executing at least a portion of the methodologies of the invention otherwise performed by controller 202 and/or detector 206, as will become apparent to those skilled in the art.

As previously explained, one or more audio files are stored in memory 204, preferably in the form of digital audio files. The digital audio files stored in memory 204 may be subsequently converted to corresponding analog audio signals by the audio CODEC 118 in the DTV receiver 100, and played during the power-on interval of the DTV receiver (see FIG. 1). Alternatively, the digital audio files may be converted to corresponding analog audio signals by a DAC 208 included in the audible indication circuit 200. Various digital audio format are contemplated by the invention, including, but not limited to, compact disc digital audio (CDDA), Moving Pictures Expert Group (MPEG) Layer-3 (MP3), Dolby® Digital (a registered trademark of Dolby Laboratories, Inc.), audio interchange file format (AIFF), QuickTime™ (a registered trademark of Apple Computer, Inc.), Windows Media Audio (WMA), WAV, etc., as will be known to those skilled in the art. It is to be understood that the present invention is not limited to these or any particular audio file formats.

The one or more audio files stored in memory 204 may comprise, for example, music clips, speech sequences (e.g., "Please wait."), sounds (e.g., tones, bells, clicks), etc. A given audio file may be played a single time, a specified number of times (e.g., twice), or repeatedly looped until the power-on interval of the DTV receiver has ended. When the DTV receiver is turned on for the first time, the audible indication circuit 200 may be configured to audibly prompt the consumer, during the power-on interval, to complete and return a warranty card for the DTV receiver. In a preferred embodiment of the invention, the audio file stored in memory 204 and played during the power-on interval of the DTV receiver comprises an advertising slogan, phrase, jingle, or other readily identifiable sound, or sequence of sounds, associated with a manufacturer of the DTV receiver (e.g., "We bring good things to life," a registered trademark of General Electric Corporation). Accordingly, the techniques of the present invention may be employed not only to audibly indicate the power-on state of the DTV receiver to the viewer, but may also be advantageously used to increase brand name recognition of the DTV receiver.

Each of the audio files stored in memory 204 are preferably representative of one or more corresponding attributes of the DTV receiver 100. By way of example only, a first audio file stored in memory 204 may be played when a power-on command has been received by the DTV receiver, and a second audio file stored in memory 204 may be played when a warranty period of the DTV receiver has expired. Multiple audio files, when present, are preferably played in succession (e.g., one after another), although the invention similarly contemplates that at least portions of multiple audio files can be played simultaneously. The plurality of audio files may be played in some prioritized order, which may be based, for example, on importance values (perceived or otherwise), or on alternative criteria, of respective states of the DTV receiver 100 to which the audio files correspond. For instance, it may be desirable to audibly indicate the warranty status (e.g., expired or not) of the DTV receiver 100 prior to audibly indicating the current time. Alternatively, the order in which the audio files are played may be user-defined, such as by selecting certain options in a configuration menu of the DTV receiver 100.

The audible indication circuit 200 may be further operative to establish a connection 210 between the controller 202 and a data source, such as, but not limited to, the Internet. The term "connection" as used herein is intended to refer generally to any type of communication medium or channel for conveying transmitted information, including a wireless communication link, such as, but not limited to, infrared, RF, satellite, etc., and a dedicated communication connection, such as, but not limited to, telephone, cable, fiber optic, etc. Using the connection 210, the controller is preferably operative to download one or more audio files for storage in memory 204, as may be selected by the viewer. In this manner, the audio file(s) played during the power-on interval of the DTV receiver may be selectively modified as desired by the viewer, much like ring tones are downloaded in a cellular telephone. The one or more audio files from the data source need not be downloaded during the power-on interval, but rather may be downloaded at times other than during the power-on interval.

Figure 3:
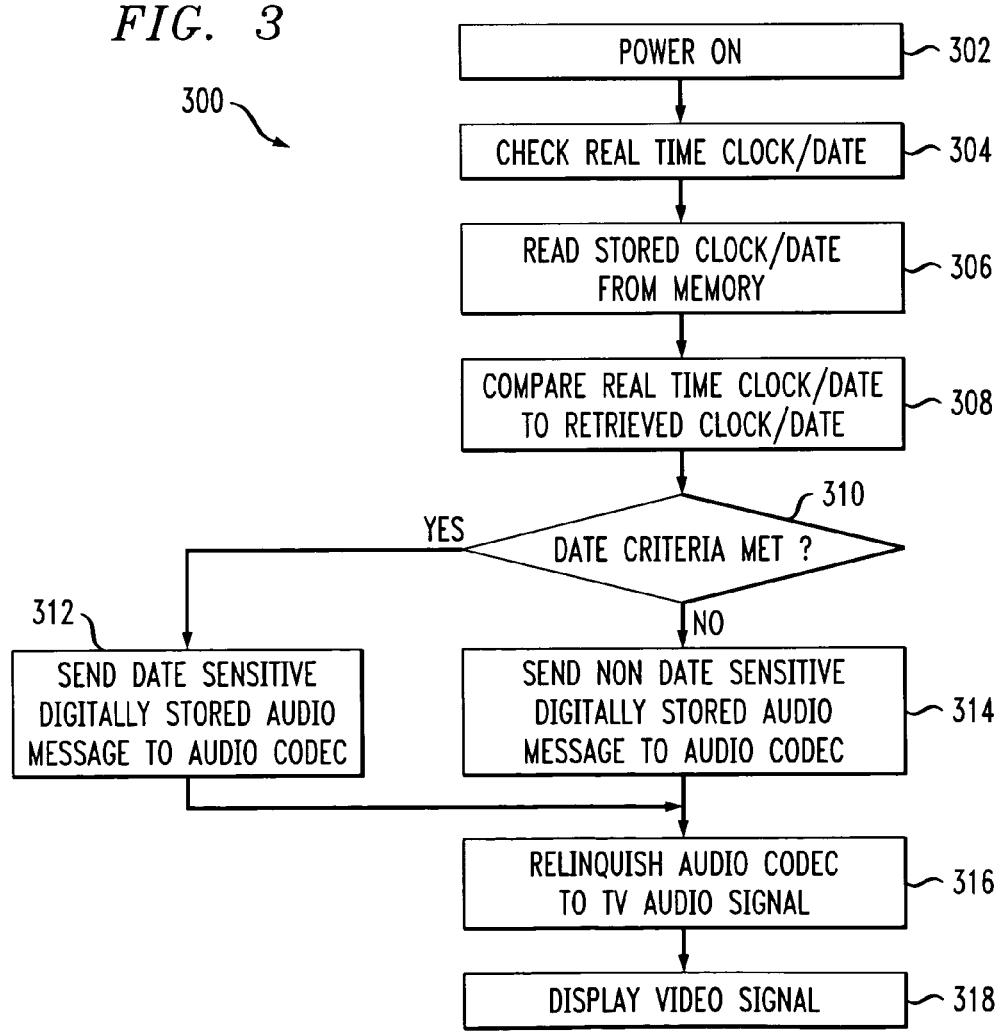
FIG. 3 is a logical flow diagram depicting an exemplary methodology for performing the techniques of the invention, in accordance with one embodiment thereof.

By way of example only, and without loss of generality, FIG. 3 is a logical flow diagram illustrating an exemplary method 300 for audibly indicating a state of the DTV receiver, in accordance with one embodiment of the invention. At least a portion of the exemplary method 300 may be performed by the controller 202 and/or detector 206 in the audible indication circuit 200 (see FIG. 2), during the power-on interval of the DTV receiver. The invention similarly contemplates that at least a portion of the exemplary audible indication method 300 may be performed, for example, by alternative control circuitry (e.g., CPU 108) in the DTV receiver 100 (see FIG. 1), as stated above.

The audible indication method 300 is preferably initiated by receipt of a power-on command in the DTV receiver at step 302, marking the start of the power-on interval. During the power-on interval, the audible indication circuit 200 shown in FIG. 2 preferably controls the audio CODEC 118 in the DTV receiver 100 (see FIG. 1), so as to prevent an audio portion of the TV broadcast signal from being presented to speakers associated with the DTV receiver. A video portion of the TV broadcast signal is also preferably blanked during the power-on interval. Step 302 may be performed in the detector 206 (see FIG. 2), or by alternative detection circuitry. Optionally, method 300, at step 304, determines the current time and/or date (Clock/Date). This time and/or date information may be used by the audible indication circuit 200 (see FIG. 2) to provide an audible indication of one or more states of the DTV receiver that may be time and/or date sensitive (e.g., warranty status, etc.). To accomplish this, the method 300, at step 306, preferably reads time and/or date information stored in memory, and compares the stored time and/or date information with the current time and/or date at step 308. At step 310, the method 300 determines whether or not certain date criteria associated with the stored time and/or date substantially matches the current time and/or date.

When the date criteria has been met, the method 300 proceeds to step 312, where one or more date sensitive audio files stored in memory are sent to the audio CODEC 118 in the DTV receiver 100 (see FIG. 1) for audibly indicating a state of the DTV receiver to the viewer during the power-on interval. When the date criteria has not been met, the method 300 proceeds to step 314, where one or more non date sensitive audio files stored in memory are sent to the audio CODEC 118 in the DTV receiver 100 (see FIG. 1). Once the power-on interval has ended, the method 300 preferably proceeds to step 316, where the controller 202 in the audible indication circuit 200 (see FIG. 2) relinquishes control of the audio CODEC 118 in the DTV receiver 100 (see FIG. 1). In this manner, the TV broadcast audio can be presented, such as on a speaker, or alternative audible indicating device, associated with the DTV receiver. The broadcast video signal is also displayed at step 318 after the power-on interval has ended.

At least a portion of the techniques of the present invention may be implemented in an integrated circuit. In forming integrated circuits, a plurality of identical die is typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A circuit for audibly indicating at least one state of a television receiver, the circuit comprising:
    memory operative to store at least one audio file; and
    a controller coupled to the memory, the controller being operative, in response to a control signal indicative of the television receiver receiving a power-on command, to forward the at least one audio file to an audio indicating device associated with the television receiver during a power-on interval of the television receiver for audibly indicating the at least one state of the television receiver.

2. The circuit of claim 1, wherein the controller is operative to forward the at least one audio file to the audio indicating device when the at least one state of the television receiver is a first value, the at least one audio file not being forwarded to the audio indicating device when the at least one state is a second value.

3. The circuit of claim 1, wherein the controller is operative during the power-on interval of the television receiver to control an audio processing device associated with the television receiver, so as to prevent an audio portion of a television broadcast signal from being presented to the audio indicating device.

4. The circuit of claim 1, wherein the at least one audio file is representative of at least one attribute of the television receiver.

5. The circuit of claim 1, wherein the at least one state comprises a power-on status of the television receiver.

6. The circuit of claim 1, wherein the at least one state comprises at least one of a current date and a current time.

7. The circuit of claim 1, wherein the audio indicating device comprises at least one speaker of the television receiver.

8. The circuit of claim 1, wherein the audio indicating device comprises at least one speaker external to the television receiver.

9. The circuit of claim 1, wherein the television receiver comprises at least one of a flat panel television receiver, a digital television receiver, a high definition television receiver, and a plasma television receiver.

10. The circuit of claim 1, wherein the controller is further operative during the power-on interval of the television receiver to retrieve a current date and, when the current date is at least equal to a reference date stored in the memory, to forward the at least one audio file to the audio indicating device.

11. The circuit of claim 1, wherein at least a portion of the memory is implemented in a memory of the television receiver.

12. The circuit of claim 1, wherein at least a portion of the controller is implemented in at least one processor of the television receiver.

13. The circuit of claim 1, wherein the controller is further operative to establish a connection with a data source for selectively downloading at least one audio file from the data source and for storing the at least one downloaded audio file in the memory.

14. The circuit of claim 1, wherein the controller is further operative to receive one or more audio files from a data source external to the circuit.

15. The circuit of claim 1, further comprising a detector operative to generate the control signal in response to the power-on command received by the television receiver, the control signal being indicative of a start of the power-on interval.

16. The circuit of claim 1, further comprising a digital-to-analog converter for converting the at least one audio file to an analog signal.

17. The circuit of claim 1, wherein the memory comprises a plurality of audio files, the audio files being representative of respective states of the television receiver, and the controller is operative during the power-on interval to forward the plurality of audio files to the audio indicating device in succession.

18. The circuit of claim 1, wherein the memory comprises a plurality of audio files, the audio files being representative of respective states of the television receiver, and the controller is operative during the power-on interval to forward the plurality of audio files to the audio indicating device in a prioritized order, the prioritized order being a function of one or more characteristics of the states of the television receiver.

19. A television receiver including a circuit for audibly indicating at least one state of the television receiver, the circuit comprising:
    memory operative to store at least one audio file; and
    a controller coupled to the memory, the controller being operative, in response to a first control signal indicative of the television receiver receiving a power-on command, to forward the at least one audio file to an audio indicating device associated with the television receiver during a power-on interval of the television receiver for audibly indicating the at least one state of the television receiver.

20. An integrated circuit including at least one circuit for audibly indicating at least one state of a television receiver, the at least one circuit comprising:
    memory operative to store at least one audio file; and
    a controller coupled to the memory, the controller being operative, in response to a first control signal indicative of the television receiver receiving a power-on command, to forward the at least one audio file to an audio indicating device associated with the television receiver during a power-on interval of the television receiver for audibly indicating the at least one state of the television receiver.

21. A circuit for audibly indicating at least one state of a television receiver, the circuit comprising:
    memory operative to store at least one audio file; and
    a controller coupled to the memory, the controller being operative during a power-on interval of the television receiver to forward the at least one audio file to an audio indicating device associated with the television receiver for audibly indicating the at least one state of the television receiver without a need for extracting information from a broadcast television signal received by the television receiver.

* * * * *